G. E. ROBISON.
VEHICLE SEAT LOCK.

No. 175,167. Patented March 21, 1876.

WITNESSES:
Chas. Nida
J. Goethals

INVENTOR:
G. E. Robison
BY
ATTORNEYS.

UNITED STATES PATENT OFFICE.

GEORGE E. ROBISON, OF LOCKE, NEW YORK.

IMPROVEMENT IN VEHICLE-SEAT LOCKS.

Specification forming part of Letters Patent No. 175,167, dated March 21, 1876; application filed February 28, 1876.

*To all whom it may concern:*

Figure 1:
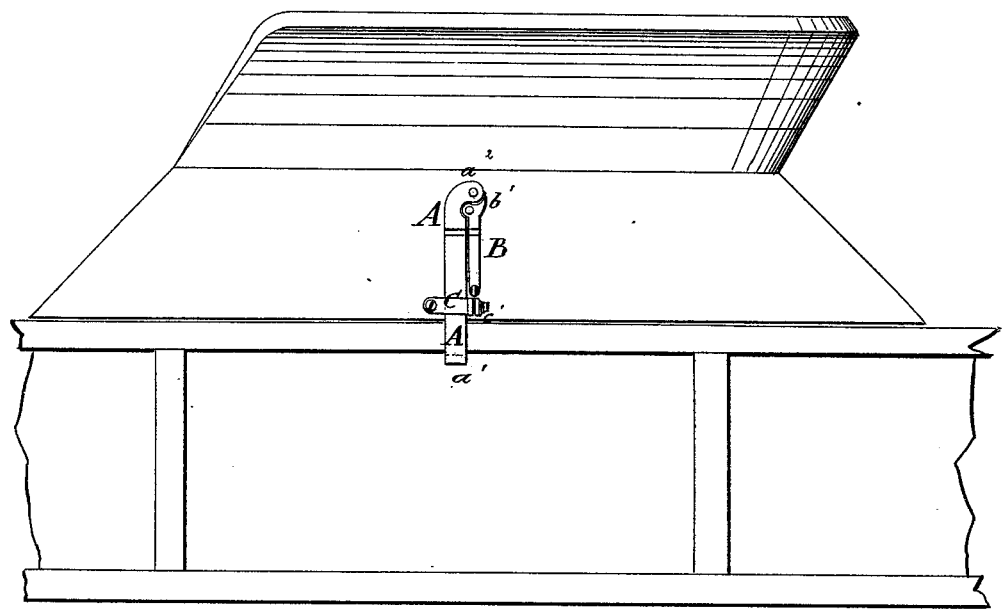
Figure 2:
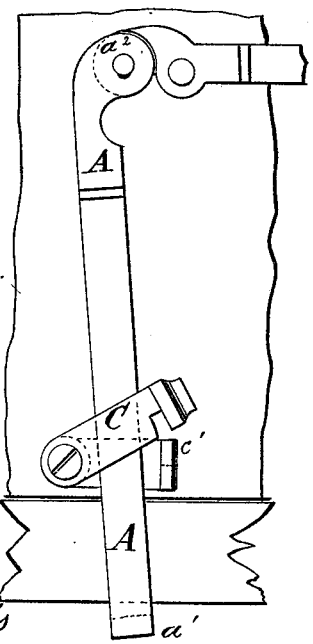
Figure 3:
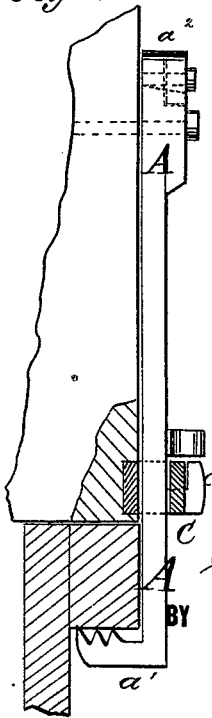

Be it known that I, GEORGE E. ROBISON, of Locke, in the county of Cayuga and State of New York, have invented a new and useful Improvement in Seat-Fastener, of which the following is a specification:

Figure 1 is a side view of my improved seat-fastener illustrating its use. Fig. 2 is a side view of the same unfastened. Fig. 3 is a front view of the same, the latch being shown in cross-section.

Similar letters of reference indicate corresponding parts.

The object of this invention is to furnish an improved device for fastening a seat to the body of a wagon, sleigh, or other vehicle, in such a way that the seat can be readily moved forward or back upon or detached from the body, and which will hold the said seat securely.

The invention consists in a seat-fastener formed of the bar provided with a foot, and having its upper end curved to one side, the pivoted lever having its upper end curved to one side, and the latch, constructed and operating as hereinafter fully described.

A represents the fastening-bar, upon the lower end of which is formed a foot, $a^1$, to underlap the rib of the vehicle body, and which has teeth formed upon it, or a rubber plate or block attached to it to prevent it from slipping upon said rib. The upper end $a^2$ of the fastening-bar A is curved to one side, and is pivoted to the upper end $b'$ of a lever, B, which end, $b'$, is also curved to one side.

The lever B is pivoted near its upper end to the vehicle seat.

By this construction by moving the free end of the lever B away from the bar A, the said bar will be lowered, so that the seat can be moved forward or back, as may be desired; and by moving the lever B, into a position parallel with the bar A, the said bar A will be raised to clamp the seat to the vehicle body. This movement of the lever B carries the pivoting-point of the lever B and bar A back beyond the pivot of the said lever, so that the strain will lock the said lever in place.

The pivot-hole in the upper end of the fastening-bar A is elongated upon its lower side, so that the lower end of the fastening-bar A can be swung outward sufficiently to free its foot from the rib of the vehicle body and allow the seat to be detached from said body when desired.

The lower part of the fastening-bar A is held down against the end of the seat by a latch, C, which is pivoted at one end at one side of the bar A, and its other end shuts down in a catch or half-keeper, $c'$, at the other side of said bar A.

The latch C is so arranged that the lower end of the lever B may shut down against it, and thus lock it in place.

Having thus described my invention, I claim as new and desire to secure by Letters Patent—

A seat-fastener formed of the bar A, provided with a foot, $a^1$, and having its upper end curved to one side, the pivoted lever B, having its upper end $b'$ curved to one side, and the latch C $c'$, constructed and operating substantially as herein shown and described.

GEORGE ELMER ROBISON.

Witnesses:
D. B. BACKUS,
EZRA HALSEY.